C. W. ABBOTT, H. R. GILSON & J. M. G. FULLMAN.
CIRCUIT EXTENSION BOX.
APPLICATION FILED MAY 26, 1914.

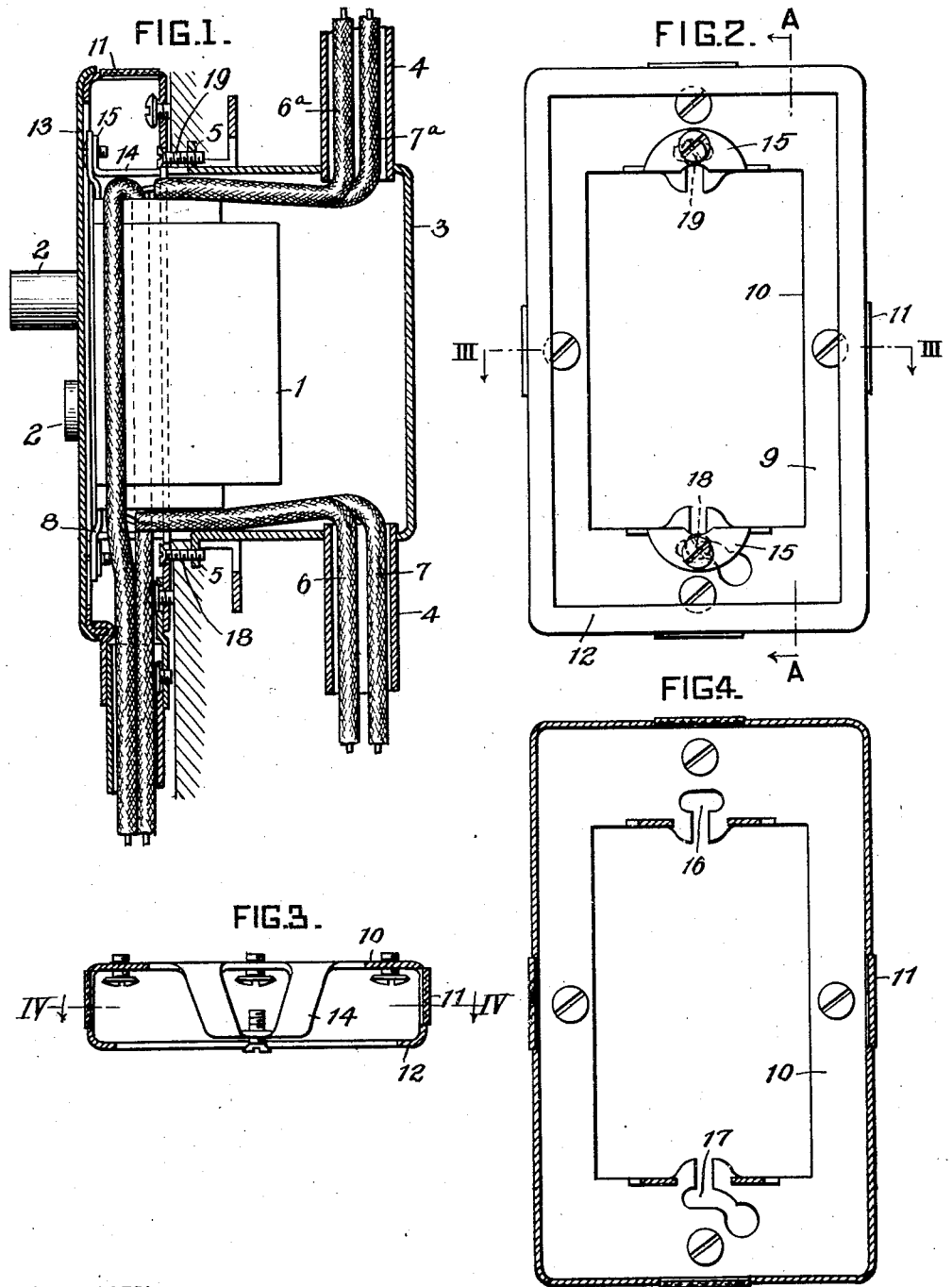

1,228,731.

Patented June 5, 1917.
2 SHEETS—SHEET 2.

WITNESSES:

INVENTORS

UNITED STATES PATENT OFFICE.

CHAUNCEY W. ABBOTT, OF AUBURN, NEW YORK, AND HENRY R. GILSON, OF BADEN, AND JAMES M. G. FULLMAN, OF SEWICKLEY, PENNSYLVANIA, ASSIGNORS TO NATIONAL METAL MOLDING COMPANY, OF PITTSBURGH, PENNSYLVANIA, A CORPORATION.

CIRCUIT EXTENSION-BOX.

1,228,731.  Specification of Letters Patent.  Patented June 5, 1917.

Application filed May 26, 1914. Serial No. 841,062.

*To all whom it may concern:*

Be it known that we, CHAUNCEY W. ABBOTT, residing at Auburn, Cayuga county, New York, HENRY R. GILSON, residing at Baden, Beaver county, Pennsylvania, and JAMES M. G. FULLMAN, residing at Sewickley, in the county of Allegheny and State of Pennsylvania, all citizens of the United States, have invented or discovered certain new and useful Improvements in Circuit Extension-Boxes, of which improvements the following is a specification.

It is frequently desirable, in buildings wired for electric lighting and like purposes, to change the location of, or provide new electrical fixtures. In effecting such alterations, the circuits for the re-located or new fixtures are usually picked up at points where the original conductors, placed within a wall, are readily accessible, as at switches or bracket outlets, and the conductors for the extended circuits are carried in surface conduits such as metal molding.

Our invention has to do with such extensions of electrical circuits and the object thereof is to provide an improved form of extension-box whereby a circuit may be picked up at, and extended from, wall switch outlets, particularly flush switch outlets. A more specific object of our invention is to provide a box for the purpose described, which will have side walls and switch-supporting brackets formed integrally with the base or bottom portion. A further object is to provide a box which may be used for various numbers of adjacent switches. And a still further object of our invention is to provide a means for adjusting circuit extension boxes in their attachment to wall outlet boxes, to the end that inaccuracies in the original setting of the outlet boxes will not cause the extension box to rest askew on the wall.

Figure 5:
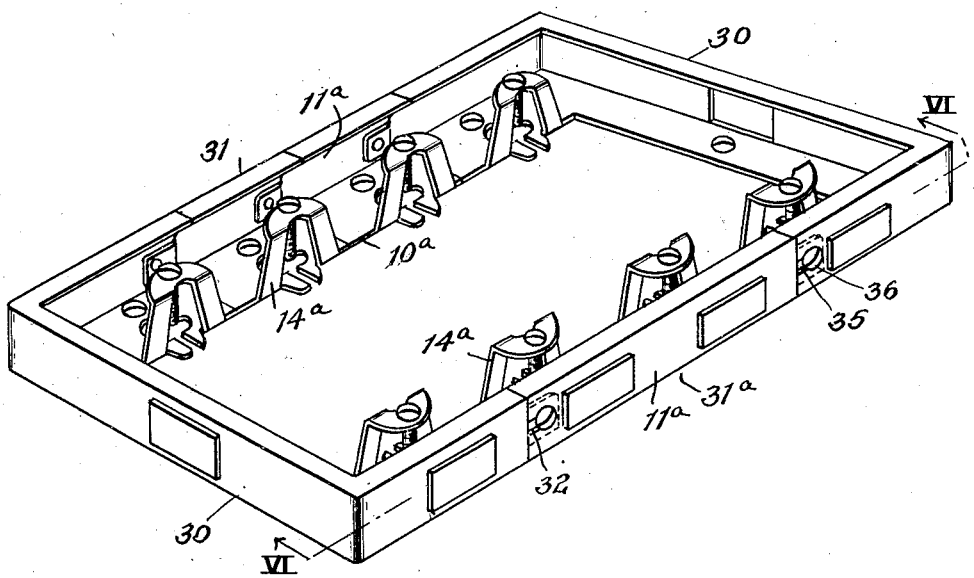

In the accompanying sheet of drawings, forming part of our specification, we have illustrated the preferred embodiments of our invention. Figure 1 is a longitudinal central sectional view showing a complete installation wherein the circuit extension box is used in picking up a circuit at an outlet box for flush switches, and extending the conductors through metal molding conduits; Fig. 2 a face view of the extension box showing its adjustable connection to the outlet box; Fig. 3 a sectional view taken on the line III—III, Fig. 2; Fig. 4 a sectional view taken on the line IV—IV, Fig. 3; Fig. 5 a perspective view of a box for a plurality of adjacent switches; and Fig. 6 a sectional view taken on the line VI—VI, Fig. 5.

In the several figures like numerals are used to designate like parts.

Flush switch structures, as illustrated herein, usually consist of a rectangular block of insulation 1 provided at its opposite ends with two pairs of binding posts between which electrical continuity may be controlled by a suitable pivoted arm operated by means of push buttons 2. Also a suitable metal attaching strip 8 extends longitudinally of the block of insulation and is suitably secured to the top of it. In the original installation of such switches to control electrical currents flowing through inner wall conductors, the usual practice has been, and now is, to place outlet boxes 3 in suitably provided openings in the wall and to attach the inner-wall conduits 4 to such boxes, as shown in Fig. 1. The outlet box has an open face to receive the switch structure, and is provided with laterally extending lugs 5 having screw-threaded openings whereby the switch, through the attaching strip 8, is attached to the box. Such original installations are completed by attaching the conductors 6, 7 and 6ª, 7ª to the binding posts of the switch, and securing a suitable cover plate to the attaching strip 8.

In order to extend a supplemental circuit from such switch-receiving outlet boxes and through surface or metal molding conduits, we provide a circuit extension box adapted to be attached to the open face of the outlet box, and to which extension box the switch may in turn be attached. Also the extension box surrounds the outer portion of the switch, permitting its inner portion to extend into the outlet box, and its walls, together with the outer portion of the switch, form a conductor-carrying passageway.

Referring to the embodiment of our invention illustrated in Figs. 1 to 4, the bottom portion 9 of the extension box is flat, extends laterally from all sides of the outlet box 3, and is provided with a central opening 10 through which the body 1 of the switch structure may extend. A continuous wall 11 projects vertically from the peripheral edge of the bottom 9 and has a relatively narrow inwardly-extending ledge 12 at its upper edge adapted to form a seat for the cover plate 13, which is attached to the strip 8 in the usual manner. Switch-supporting brackets 14 extend vertically from opposite ends of the inner edge of the bottom 9, and, as shown herein, may be formed integrally with the bottom. These brackets are bent to form laterally-extending lugs 15 substantially in the plane of the ledge 12, such lugs being provided with screw-threaded holes for the attachment of the switch strip 8.

By providing a relatively narrow ledge 12 and supporting the switch on brackets 14 extending from the bottom of the box the conductor-carrying passageway surrounding the body of the switch is freely accessible. A further advantage in having the brackets extending from the bottom is that the entire box may be made of integral construction, that is, the bracket and side walls may be formed integrally with the bottom and from a single sheet of metal, a suitable series of die presses being used to form the sheet into the desired shape.

Our invention also has to do with the attachment of the extension box to the outlet box. It sometimes happens that outlet boxes, when placed in wall recesses, are not set true, so that when circuit extension boxes are attached to the lugs 5, no means of adjustment being provided, such extension boxes will rest askew on the face of the wall, which of course is undesirable. In order to have the boxes set squarely on the wall surface, and at the same time be securely attached to obliquely set outlet boxes, we provide a means of attachment permitting of an adjustment of the extension box with relation to outlet box in the general plane of their connection, the attaching means preferably being such that the extension box may be applied to the outlet box after the attaching screws are partly inserted into the lugs 5.

The adjustment which we provide is preferably effected by forming slots 16 and 17 in oppositely disposed portions of the bottom 10, such slots extending to each side of the center line of the box. The slot 17 diverges at one end from the central opening in the bottom 10 and is enlarged at such end to receive the head of a screw 18 used for connecting the two boxes. Also, both slots open into the central opening of the bottom 10, although it is essential in this particular construction that only the slot 16 be provided with such opening to receive the shank of the attaching screw 19 because the head of the screw 18 enters the slot 17 through the above mentioned enlarged outer end of the slot. It is for convenience of manufacture, as well as for the purpose of rendering the circuit extension box capable of being connected to the outlet box otherwise than as hereinafter explained, that the slot 17 opens into the central opening.

In connecting the extension box to the outlet box, the screws 18 and 19 being partially inserted into the lugs 5, the open end of the slot 16 is first slipped beneath the head of the screw 19, and while the shank of such screw is in the contracted portion of such slot, the enlarged portion of the slot 17 is slipped over the head of the screw 18. The shanks of the screws 18 and 19 will then be within the slots 17 and 16, respectively, thus affording a temporary attachment which may be made secure by tightening the screws, the extension box being simultaneously held in squared position upon the wall.

Figure 6:
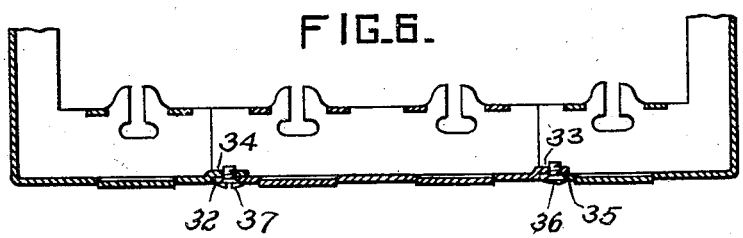

In Figs. 5 and 6 we have illustrated substantially the same form of circuit extension box as that illustrated in Figs. 1 to 4 but made of several sections and adapted to receive a plurality of switch structures, in this instance four. The parts of this box may be designated as end sections 30 and intermediate sections 31 and 31ª. The end sections, as illustrated herein, are, with the exception of the means for attaching them to the intermediate sections, the same as the portion of the box of Figs. 1 to 4 shown to the left of the line A A, Fig. 2; while the intermediate sections consist of base portions 10ª, side walls 11ª and brackets 14ª all formed integrally from a single sheet of metal. The intermediate sections may consist of a number of single-bracket portions, as is indicated for the section 31, or they may be formed integrally throughout, as indicated at 31ª, and of a length depending on the number of adjacent switches there are in the particular installation for which the box is to be used. In order to connect the several sections into a box structure each intermediate section is provided with a slot 32 at one end, and with an off-set lug 33 at its other end. The end section is provided at one end with an off-set lug 34 adapted to receive a screw 37 which engages the slot 32 of the intermediate section, and at the other end of the end section there is a slot 35 adapted to receive a screw 36 inserted in the lug 33 of the intermediate section. By such an arrangement the box sections may be made alike and interchangeable.

We claim as our invention:

1. A circuit extension box comprising a substantially flat bottom portion adapted to be attached to and to extend laterally from the open side of an outlet box for a switch and having a central open area adapted to receive the body of a switch, a side wall extending substantially vertical to said bottom and from the outer edge thereof, said bottom and side wall forming an open channel to receive and contain electrical conductors, and switch-supporting brackets formed integrally with said bottom portion and extending from the edge of the central opening therein at angles to the general plane of said bottom portion and in the same general direction as the side wall.

2. A circuit extension box comprising a substantially flat bottom portion adapted to be attached to and to extend from the open side of an outlet box for a switch and having a central opening adapted to receive the body of a switch, a side wall extending substantially vertical to said bottom portion and from the outer edge thereof, said bottom and side wall forming an open channel to receive and contain electrical conductors, and switch-supporting brackets extending angularly from the edge of the central opening of the bottom portion and in the same general direction as said side wall, said side wall and brackets being formed integrally with the bottom portion.

3. A circuit extension box comprising a bottom portion with a central opening, a side wall extending from the outer edge and switch-supporting brackets from the inner edge of said bottom portion and substantially vertical to the plane thereof, said wall and brackets being formed integrally with the bottom portion and extending substantially the same distance and in the same general direction therefrom, and said bottom and side wall forming an open channel to receive and contain electrical conductors.

4. The combination of an outlet box having an open face and provided with lugs extending laterally from opposite sides thereof, a circuit extension box adjacent to said open face and comprising a bottom portion extending laterally from the sides of said outlet box and a wall projecting vertically from the outer edge of the bottom portion, said bottom having a central opening and provided with oppositely disposed elongated slots, and securing members extending through said slots and engaging said outlet box lugs, whereby said boxes may be adjusted with relation to each other in the general plane of their attachment.

5. The combination of an outlet box having an open face and provided with lugs extending laterally from opposite sides thereof, a circuit extension box adjacent to said open face and having as a part thereof a bottom portion extending laterally from the sides of said outlet box, said bottom portion having a central opening registering with the open face of the outlet box and provided with a pair of screw-receiving elongated slots disposed on opposite sides of said opening, a screw extending through each of said slots and engaging said outlet box lugs, the end of one of said slots diverging from said central bottom opening and provided with an enlargement adapted to receive the head of the screw in such slot, and the other of said slots opening into said central bottom opening.

In testimony whereof we have hereunto set our hands.

CHAUNCEY W. ABBOTT.
HENRY R. GILSON.
JAMES M. G. FULLMAN.

Witnesses:
PAUL N. CRITCHLOW,
FRANCIS J. TOMASSON.